United States Patent [19]
Gabillet

[11] Patent Number: 5,994,795
[45] Date of Patent: Nov. 30, 1999

[54] METHOD AND A SYSTEM FOR ELECTRICALLY POWERING ELECTRONIC EQUIPMENT

[75] Inventor: Jean-Paul Gabillet, Ploumilliau, France

[73] Assignee: Alcatel, Paris, France

[21] Appl. No.: 09/062,554

[22] Filed: Apr. 20, 1998

[30] Foreign Application Priority Data

Apr. 21, 1997 [FR] France .................................. 97 04879

[51] Int. Cl.⁶ .................................................. H02S 7/00
[52] U.S. Cl. .................. 307/66; 307/26; 307/82
[58] Field of Search ................... 307/43, 44, 64, 307/65, 66, 80, 82, 85, 86, 87, 45, 46, 48, 58, 18, 21–23, 25, 26, 29, 151

[56] References Cited

U.S. PATENT DOCUMENTS

| | | | |
|---|---|---|---|
| 5,241,217 | 8/1993 | Severinsky | 307/64 |
| 5,247,205 | 9/1993 | Mototani et al. | 307/66 |
| 5,477,091 | 12/1995 | Fiorina et al. | 307/66 |
| 5,483,108 | 1/1996 | Girard et al. | 307/64 |
| 5,642,002 | 6/1997 | Mekanik et al. | 307/64 |

FOREIGN PATENT DOCUMENTS

| | | |
|---|---|---|
| 0575101A2 | 12/1993 | European Pat. Off. . |
| 0578531A2 | 1/1994 | European Pat. Off. . |
| 0696831A2 | 2/1996 | European Pat. Off. . |
| 2241394 | 8/1991 | United Kingdom . |

*Primary Examiner*—Richard T. Elms
*Attorney, Agent, or Firm*—Sughrue, Mion Zinn, Macpeak & Seas, PLLC

[57] ABSTRACT

The invention relates to an electrical power supply system for powering electronic equipment. The system uses an AC main power supply under normal conditions and uses a DC secondary power supply to supply power if the main power supply fails. The system has a means for detecting the failure of the main supply and for switching over to the secondary supply in a back-up mode. Each piece of electrical equipment has a distinct power converter that delivers internal power required by each piece of equipment. The power converter of each is powered directly by the main power supply under normal conditions and directly by the secondary power supply in the back-up mode. The system of the instant invention is less costly and produces less loss due to conversions than the prior art systems.

9 Claims, 2 Drawing Sheets

U.S. Patent  Nov. 30, 1999  Sheet 1 of 2  5,994,795
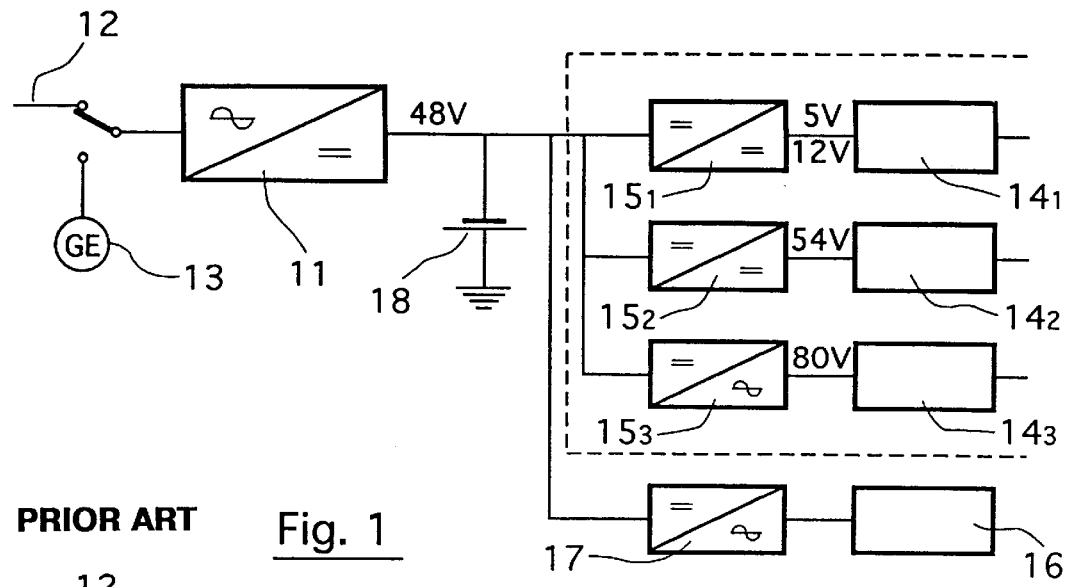
PRIOR ART Fig. 1
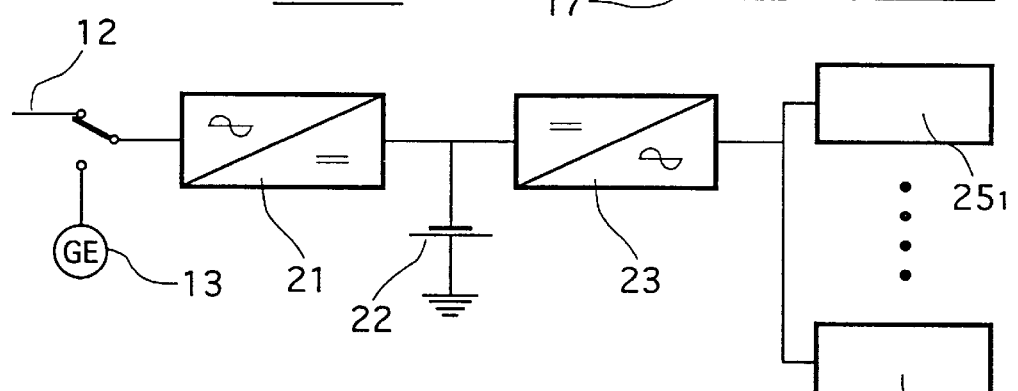
PRIOR ART Fig. 2A
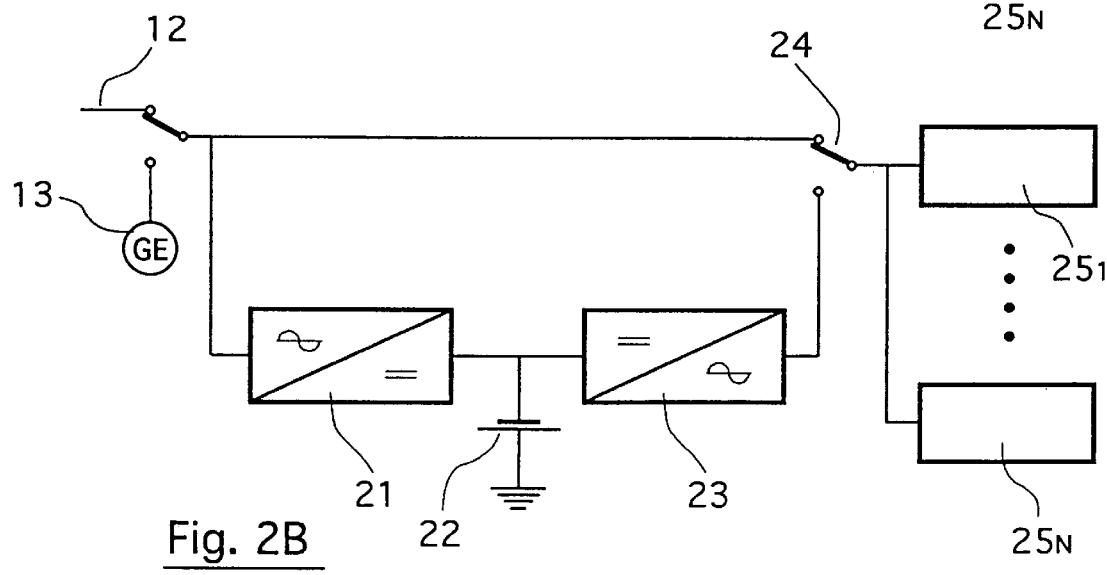
Fig. 2B
PRIOR ART

METHOD AND A SYSTEM FOR ELECTRICALLY POWERING ELECTRONIC EQUIPMENT

FIELD OF THE INVENTION

The invention relates to electrically powering electronic equipment. More precisely, the invention relates to backed-up type power supply systems which include means making it possible to continue to supply electrical power even if the main power source fails.

The invention is particularly but not exclusively applicable to telecommunications and/or data-processing systems in which a plurality of distinct items of equipment are situated on the same site.

BACKGROUND OF THE INVENTION

In presently-used telecommunications systems, power is supplied using the technique shown in FIG. 1. An on-line rectifier 11 is powered by the low-voltage mains 12 or by an electricity generator set 13. The rectifier delivers a DC voltage, e.g. 48 volts, to the telecommunications equipment $14_1$ to $14_3$.

Depending on the needs of the equipment, the following are provided:

- a DC-to-DC converter $15_1$ delivering DC voltages of 5 volts and 12 volts, for example;
- a booster $15_2$ delivering a DC voltage of 54 volts, for example; and
- a ringing inverter $15_3$, delivering an AC voltage of 80 volts, for example.

If computer peripherals 16 are present that require an AC voltage (e.g. 230 V), an inverter 17 is used.

Finally, one or more batteries 18, charged by the energy delivered by the rectifier 11, automatically take over from the power supply in the event of a problem.

That technique suffers from numerous drawbacks. In particular, it assumes the use of a high-power rectifier which gives rise to considerable dissipation, as appears more clearly on reading Table I.

In addition, the means required are costly and voluminous. Finally, that technique requires electrical cables of large section to be used.

Uninterruptible power supplies (UPSs) for delivering AC are also known that are used for AC-powered equipment such as computer equipment.

Two types of architecture are used for UPSs, shown respectively in FIGS. 2A and 2B, namely on-line architecture (FIG. 2A), and off-line architecture (FIG. 2B).

Each of the power supplies comprises:

- an AC-to-DC converter 21;
- an energy storage device 22; and
- a DC-to-AC converter 23.

The drawback with those techniques is that they need an inverter 23 that is capable of delivering the entire power requirement of all of the items of equipment $25_1$ to $25_N$ that are to be powered. Such an inverter 23 constitutes the most costly part of the UPS.

In addition, those techniques require the use of electrical cables that are of large section.

In the off-line power supply, a changeover switch 24 makes it possible to switch over from the main power supply to the back-up power supply.

In contrast, in the on-line power supply, the electrical energy received from the mains 12 or from an electricity generator set 13 always passes through both converters 21 and 23, which naturally gives rise to considerable losses. In addition, that technique requires a first AC-to-DC conversion stage 21 that operates at full power.

OBJECTS AND SUMMARY OF THE INVENTION

A particular object of the invention is to mitigate the various drawbacks of the prior art.

More precisely, an object of the invention is to provide a system for powering electronic equipment, which system is less costly than present systems, as regards:

- the equipment to be implemented;
- the electrical conductors used; and/or
- electricity consumption.

In other words, a particular object of the invention is to provide such a system that enables the cost per power supply watt to be reduced considerably.

Another object of the invention is to provide such a power supply system that is easily upgradable and that is universal, making it possible, in particular to power telecommunications equipment and data-processing equipment.

A further object of the invention is to provide such a power supply system that reduces electrical losses to as low as possible, compared with known systems.

Yet another object of the invention is to provide such a power supply system that is more compact than present systems.

These objects and others which appear below are achieved by the invention by means of an electrical power supply system for powering at least one item of electronic equipment, the system being of the type comprising:

- an AC main power supply used under normal conditions;
- an energy storage unit used as a DC secondary electrical power supply under back-up conditions; and
- means for detecting failure of said main power supply, and for then switching over to a back-up mode;

wherein each of said items of electronic equipment is associated with a distinct power converter delivering the internal electrical power required by said item of equipment, and powered:

- directly by said main power supply under normal conditions;
- directly by said secondary power supply under back-up conditions.

Naturally, the term "associate" is used to cover both the case when the converter is external (placed in the vicinity of the item of equipment) and also the case when it is internal (i.e. integrally included inside the item of equipment).

Thus, energy losses are reduced considerably: each item of equipment receives the power it needs directly, i.e. without going through a centralized converter, in a converter that is specific to it, and that matches its needs.

This technique makes it possible to omit the full-power inverters used in conventional power supply systems, and constituting the elements that are the most costly.

In addition, this technique makes it possible to implement AC power supply set-ups (UPSs) that are low in cost and that are suitable for all computer hardware.

In a first embodiment of the invention, said power converters are powered via a single power supply bus connected selectively to said main power supply or to said secondary power supply.

This approach makes it possible to obtain an architecture that is particularly simple and therefore low in cost.

In a second embodiment of the invention, said power converters may be powered via two distinct power supply buses, namely a main power supply bus connected to said main power supply and a secondary power supply bus connected to said secondary power supply.

Advantageously, said secondary power supply source delivers a DC voltage in the vicinity of the peak voltage of said main power supply.

By choosing such a voltage, it is possible firstly to achieve very good efficiency, approximately in the range 95% to 97%, and secondly to use electrical cables of small section.

Preferably, said energy storage unit is charged, under normal conditions, via said main power supply.

It is thus possible to use a battery charger instead of the on-line rectifiers used in known systems. The saving in secondary energy rating that needs to be installed, and therefore the saving in equipment, may thus be by a factor in the range 5 to 10 (as a function of the battery running time and of the required recharging time).

Said main power supply may belong to the group comprising the mains and electricity generator sets, and more generally all AC power supplies.

In addition, said items of electronic equipment may belong to the group comprising telecommunications equipment and data-processing apparatus (or computer hardware).

Advantageously, at least some of said converters include power factor converter (PFC) means for keeping in phase the voltage and the current of the internal electrical power delivered to the equipment with which they are associated.

Such means are particularly useful when power is supplied over a single bus. They make it possible to reduce or even to eliminate harmonics.

The invention further provides an electrical power supply method corresponding to the above-described system.

BRIEF DESCRIPTION OF THE DRAWINGS

Other characteristics and advantages of the invention appear more clearly on reading the following description of a preferred embodiment given by way of non-limiting example, and with reference to the accompanying drawings, in which:

FIG. 1, discussed in the introduction, is a diagram showing the power supply architecture used conventionally in the telecommunications field;

FIGS. 2A and 2B, also discussed in the preamble, show two known embodiments of an uninterruptible power supply for delivering AC.

MORE DETAILED DESCRIPTION

Figure 3:
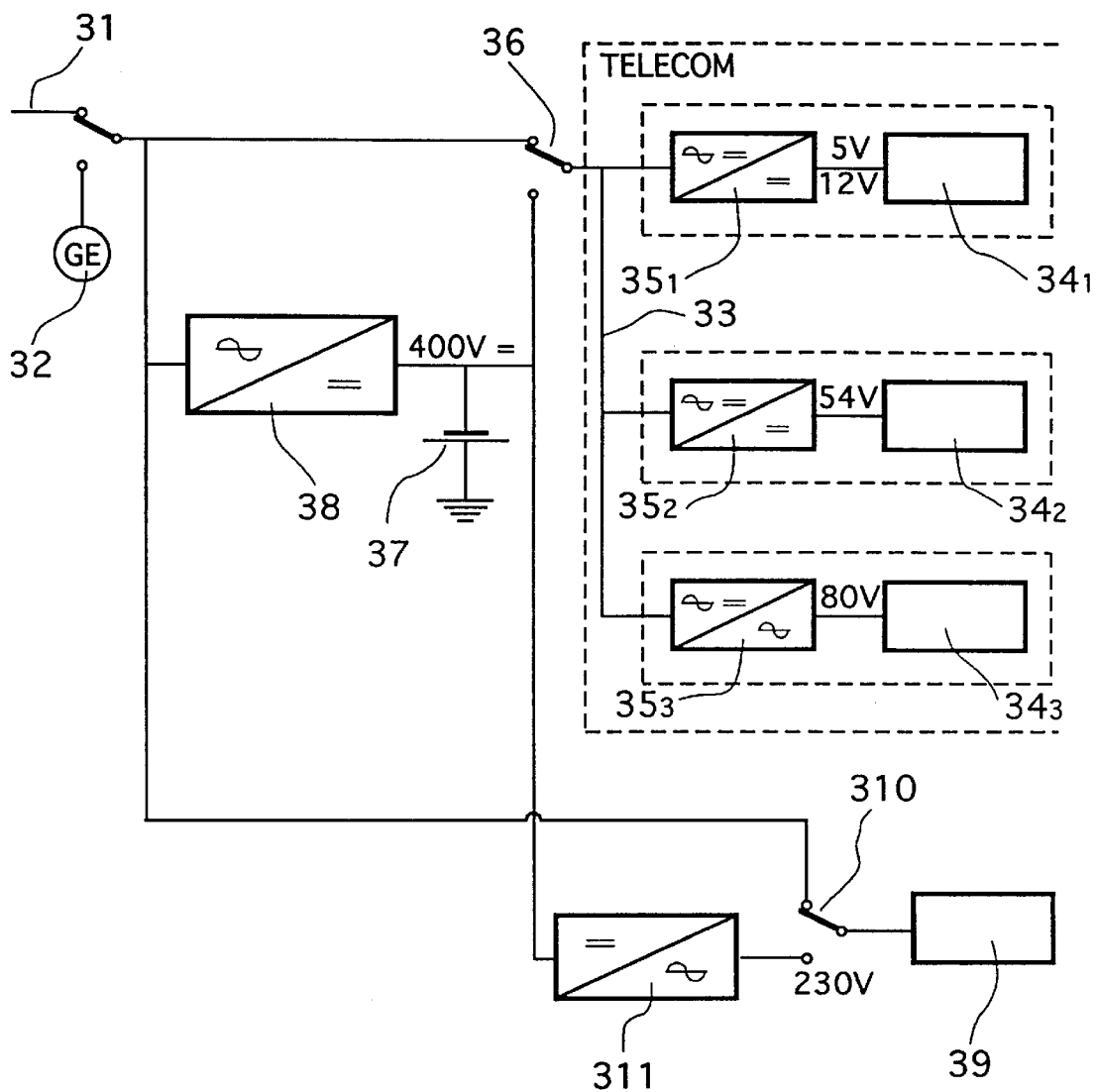
FIG. 3 shows an electrical power supply system of the invention.

In general terms, the invention is based on implementing the following steps:
- associating each of the items of electronic equipment with a distinct power converter delivering the internal electrical power required by the item of equipment;
- under normal conditions, powering each of the power converters directly by means of an AC main power supply;
- going over to a back-up mode in the event that failure of the main power supply is detected; and
- in back-up mode, powering each of the power converters directly from an energy storage unit used as a DC secondary power supply.

FIG. 3 shows an electrical power supply system of the invention implementing this method.

The main power supply is either the low-voltage mains 31, or an electricity generator set 32, and, in a normal mode, it powers a distribution bus 33 directly. The distribution bus itself powers various items of telecommunications equipment $34_1$ to $34_3$ via distinct specific converters $35_1$ to $35_3$ dedicated to corresponding ones of the items of equipment.

In back-up mode, i.e. in the event of failure of the main power supply means 31 and/or 32, the changeover switch 36 switches over to the battery 37 which then powers the distribution bus 33.

The converters $35_1$ to $35_3$ are thus capable of converting either an AC voltage (normal conditions) or a DC voltage (back-up conditions). They output the DC and/or AC internal voltages required by the equipment $34_1$ to $34_3$.

The converters preferably include integral power factor converters (PFCs). In particular, this makes it possible to comply with regulations and standards concerning harmonic distortion without additional cost.

The battery 37 delivers a relatively high DC voltage of 400 V (i.e. in the vicinity of the peak value of the AC voltage delivered under normal conditions), which makes it possible to obtain efficiency greater than 95%, and to reduce the cost of the power distribution conductors. Since the emergency (or back-up) voltage is multiplied by a factor of 7 compared with conventional techniques, and since current is divided by the same factor, the sections of the cables can be divided by a factor in the range 20 to 50 depending on whether it is the current or the voltage drop that is the limiting factor.

Because of this high voltage, various safety elements are provided for protecting people, and in particular:
- protection is provided on the converters and/or the equipment (e.g. a cover is installed);
- distribution is protected by using cables having reinforced insulation (consumer cables); and
- protection is provided on the accesses to batteries (covers, racks, etc.)

The battery 37 is charged by the charger 38 which is powered by the main power supply 31 and/or 32 under normal conditions.

The system of the invention also makes it possible to power data-processing apparatus 39 which requires a mains-type AC voltage.

Under normal conditions, a second changeover switch 310 connects the apparatus 39 directly to the mains. Under back-up conditions, the switch 110 connects the apparatus 39 to an inverter 311 that is of low power because it is dedicated specifically to the apparatus 39. The inverter 311 is powered by the battery 37.

The conventional system shown in FIG. 1 is compared below with the system of the invention (FIG. 3);

As regards the conventional system, if:
- $k = T_{recharge}/T_{runtime}$ is the battery recharging coefficient, generally in the range 5 to 10;
- $\eta_c$ is the efficiency of the rectifier 11;
- $\eta_0$ is the efficiency of the inverter 17;
- PT is the power required by the items of telecommunications equipment (power of the inverter); and
- PI is the power required for the items of data-processing equipment;

then the secondary energy losses during recharging are:

$$\frac{1-\eta_c}{\eta_c}\left[\frac{1-\eta_0}{\eta_0}PI + PT\right]\frac{1+k}{k}$$

The power to be installed is thus:

in the inverter: PI in the 48-V set-up:

$$\left[\frac{1}{\eta_0}PI + PT\right]\frac{1+k}{k}$$

The system of the invention has the following secondary energy losses:

$$\frac{1}{k}\frac{1-\eta_c}{\eta_c}\left[\frac{1-\eta_0}{\eta_0}PI + PT\right]$$

The power to be installed in the secondary set-up is as follows:

$$P_{inst} = \frac{1}{k}\left[\frac{1-\eta_0}{\eta_0}PI + PT\right]$$

If the example of powering a 10-kW exchange with battery running time of 3 hours and battery recharging time of 15 hours is considered, the approximate values shown in Table I below are obtained.

TABLE I

|  | conventional system | invention |
|---|---|---|
| power consumed during recharging | 13.5 kW | 12.1 kW |
| recharging power | 2 kW | 2 kW |
| rectifier power to be installed | 12 kW | 2 kW |
| secondary power dissipation | 1.3 kW continuously 1.5 kW while recharging | 0 continuously <100 W while recharging |
| volume occupied | 1 rack (SAM) | 1 standard 8U case |
| estimated cost | 120,000 French francs | 20,000 French francs |
| size of the distribution cables | 2 × 16 mm² | 2 × 1.5 mm² (standard cable) |
| size of battery cables | 2 × 120 mm² | 2 × 2.5 mm² |

Although these values are given merely by way of indication, it is clearly apparent that the solution of the invention is very advantageous, in particular as regards the following aspects:

consumed power and dissipated power;

cost;

size of conductors;

compactness.

I claim:

1. An electrical power supply system for powering a plurality of items of electronic equipment, the system being of the type comprising:

an AC main power supply used under normal conditions;

an energy storage unit used as a DC secondary electrical power supply under back-up conditions; and means for detecting failure of said main power supply, and for then switching over to a back-up mode;

wherein each of said items of electronic equipment is associated with a distinct power converter delivering the internal electrical power required by said item of equipment, forming a plurality of power converters, and powered:

directly by said main power supply under normal conditions;

directly by said secondary power supply under back-up conditions.

2. A power supply system according to claim 1, wherein said power converters are powered via a single power supply bus connected selectively to said main power supply or to said secondary power supply.

3. A power supply system according to claim 1, wherein said power converters are powered via two distinct power supply buses, namely a main power supply bus connected to said main power supply and a secondary power supply bus connected to said secondary power supply.

4. A power supply system according to claim 1, wherein said secondary power supply source delivers a DC voltage in the vicinity of the peak voltage of said main power supply.

5. A power supply system according to claim 1, wherein said energy storage unit is charged, under normal conditions, via said main power supply.

6. A power supply system according to claim 1, wherein said main power supply comprises either a mains or electricity generator set.

7. A power supply system according to claim 1, wherein said items of electronic equipment comprises either telecommunications equipment or data-processing apparatus.

8. A system according to claim 1, wherein at least some of said converters include means for keeping in phase the voltage and the current of the internal electrical power delivered to the equipment with which said converters are associated.

9. A method of electrically powering a plurality of items of electronic equipment, said method comprising the following steps:

associating each of the items of electronic equipment with a distinct power converter delivering the internal electrical power required by said item of equipment, forming a plurality of power converters;

under normal conditions, powering each of the power converters directly by means of an AC main electrical power supply;

going over to a back-up mode in the event that failure of the main power supply is detected; and in back-up mode, powering each of the power converters directly by means of an energy storage unit used as a DC secondary electrical power supply.

* * * * *